United States Patent [19]

Tani

[11] Patent Number: 5,267,108
[45] Date of Patent: Nov. 30, 1993

[54] FLYING HEAD SLIDER

[75] Inventor: Toyofumi Tani, Amagasaki, Japan

[73] Assignee: Mitsubishi Denki Kabushiki Kaisha, Japan

[21] Appl. No.: 730,540

[22] Filed: Jul. 16, 1991

[30] Foreign Application Priority Data

Oct. 22, 1990 [JP] Japan ................. 2-285464

[51] Int. Cl.$^5$ .................... G11B 5/60; G11B 11/10
[52] U.S. Cl. .................................................... 360/103
[58] Field of Search ............................ 360/103, 102

[56] References Cited

U.S. PATENT DOCUMENTS 4,893,204  1/1990  Yamada et al. ............... 360/103

FOREIGN PATENT DOCUMENTS 5465884  6/1990  Japan .

OTHER PUBLICATIONS

"An Air Bearing Design for a Small Diameter Disk Drive," STLE SP 26 (1989) pp. 135–140.

Primary Examiner—P. M. Dzierzynski
Assistant Examiner—Richard Hanig
Attorney, Agent, or Firm—Wolf, Greenfield & Sacks

[57] ABSTRACT

A flying head slider with plural inclined planes tapered along the flowing direction of the air to a clearance between a disk and the slider to avoid the influence on the flying characteristic by the foreign material adhered thereto in touch with the disk. A flying head slider with tapered portions each provided at each widthwise end and an inclined plane provided therebetween to narrow the width of the tapered portions for separating the centers of the dynamic pressure by the flowing air as far as possible in the widthwise direction thereby to stabilize the rolling of the slider. A flying head slider with tapered portions each provided at each widthwise end and an inclined plane provided therebetween at a taper angle smaller than that of an inclined plane of the tapered portions which determines the flying characteristic in order to separate the centers of the dynamic pressure in widthwise direction and to increase the peak values of the dynamic prpessure, so that the rolling and pitching of the slider is stabilized.

18 Claims, 15 Drawing Sheets 5,267,108

FLYING HEAD SLIDER

BACKGROUND OF THE INVENTION

1. Field of the Invention

This invention relates to a flying head slider employed in a magnetic disk drive, a magneto-optical disk drive, etc.

2. Description of Related Art

An apparatus having the same construction as a slider-type magnetic head employed in a hard disk drive has been known as a bias magnetic field generating apparatus for impressing a bias magnetic field to a magneto-optical disk (e.g., INTERNATIONAL SYMPOSIUM ON OPTICAL MEMORY 1987 September T. NAKAO et al.).

FIG. 1 is an enlarged perspective view showing the construction of a conventional slider-type magnetic head and its peripheral in a magneto-optical disk drive. In FIG. 1, a magnetic head 2 is provided to face the upper surface of a magneto-optical disk 1 (referred to as a disk hereinafter), flying at several μm height by the dynamic pressure caused by the rotation of the disk 1 in a direction shown by a white arrow. The magnetic head 2 is a rectangular flat plate and is constituted by a slider 21 thinned approximately several μm on the leading edge side and a bulk head 24 as a bias magnetic field generating unit. The bulk head 24 comprises a U-shaped core 22 buried at the central end of the trailing edge side of the slider 21 and a coil 23 wound around the curved portion of the core 22. The slider 21 of the magnetic head 2 is fitted to a supporting arm 5 via a gimbal spring 4, so that the magnetic head 2 is able to pitch (rocking in a radial direction of the disk 1) and roll (rocking in a peripheral direction of the disk 1) around a pivot (not shown) formed in the gimbal spring 4. Accordingly, the magnetic head 2 can follow up the deflection at the surface of the disk 1 by the rocking of the magnetic head 2. Moreover, the magnetic head 2 is movable in the radial direction of the disk 1 by advance and retreat of the supporting arm 5.

An optical head 3 is provided beneath the lower surface of the disk 1, confronting where a bias magnetic field is generated by the bulk head 24. The optical head 3 heats the bias magnetic field generating area when recording or erasing data thereby to form a reversed magnetic domain.

FIG. 2 is an enlarged view showing the construction of the conventional slider 21, more specifically, FIG. 2(a) is a side sectional view and FIG. 2(b) is a bottom view of the conventional slider. The slider 21 is a flat plate of 10 mm long, 8 mm wide and about 1 mm thick, beneath which enters the air caused by the rotation of the disk 1 from a longitudinal direction shown by a white arrow. A tapered part 25 is formed on the bottom face of the slider 21 at an angle θ (14.5 mrad) almost across the width of the slider 21 from a position about 0.4–0.8 mm away from the end face at the leading edge of the slider 21 towards the trailing end to the leading edge end face. Two grooves 26, 26 are extending in a longitudinal direction of the slider 21. The bulk head 24 mentioned earlier is built in the center of an end face at the trailing edge of the slider 21.

When the air enters below the tapered part 25 of the slider 21 in the above-described structure, the air flow is throttled, thereby generating the dynamic pressure and eventually buoyancy in a direction to lift the slider 21 of the disk 1.

Meanwhile, the disk 1 is always moving up and down as a result of the surface deflection thereof, and accordingly, the slider 21 is rolling and pitching. At this time, if an end of the slider 21 touches with the disk 1, a foreign substance 10 such as dust or the like adhering onto the disk 1 may be transferred as indicated by hatching in FIG. 2 to the tapered part 25. In such case as above, the flying characteristic of the slider 21 is worsened by the adhesion of the foreign substance 10, and its flying height decreases as described for example, in Treatise No. 86-1058B by Mikio Tokuyama et al. under the title of "Flying Characteristic of A Slider With Adhered Dust" in Japan Society of Mechanical Engineers, Vol. 53, No. 488. Particularly, different from a magnetic disk drive which can be sealed thereinside, since a magneto-optical disk drive is open to the air in order to exchange the disk 1, the foreign substance 10 more easily adheres to the disk 1 and further to the end of the slider 21 through contact of the disk 1 with the slider 21.

When the flying height reduces, the slider 21 is easier to be brought into contact with the disk 1. The worst of it is that the surface of the disk 1 may be scratched to decrease the reliability of the drive.

In the meantime, the tapered part 25 is formed approximately across the width of the conventional slider at the leading edge thereof, and the centers of the dynamic pressure of the slider are found in the vicinity of positions A1, A2 closer to the trailing edge than the tapered part 25. Therefore, when the slider 21 rolls following up the deflection of the surface of the disk 1, the stability of the rolling motion is influenced by the center positions of the dynamic pressure, that is, the stability becomes worse as the positions A1, A2 come closer to the center of the slider 21. If the stability of the rolling is deteriorated, the slider 21 collides with the disk 1, thereby finally breaking the disk 1. Since the dynamic pressure is smaller and the flying height of the slider is lower especially when loading/unloading, the poor stability of the rolling motion may cause frequent collisions of the slider 21 with the disk 1.

Moreover, if the stability during pitching decreases, the gap between the bulk head 24 and disk 1 (flying height) changes, and such problems that the bulk head 24 collides with the disk 1 thereby breaks the disk 1, that the impressing magnetic field onto the disk 1 changes whereby data onto the disk 1 cannot be recorded, etc., are brought about.

SUMMARY OF THE INVENTION

Accordingly, this invention has been devised to solve the above-described drawbacks of the prior art, and has for its essential object to provide a flying head slider wherein a plurality of inclined planes are formed along the flowing direction of the air entering between the slider and a disk, at a tapered part on the leading edge side, so that a taper angle of the inclined plane fundamentally determining the flying characteristic of the slider does not change even when a foreign substance adheres to the other inclined plane closer to the leading edge, accordingly without changing the flying characteristic of the slider.

A second object of this invention is to provide a flying head slider wherein an area is defined between tapered parts formed on both sides of the slider, with almost the same width as that of the tapered parts, thereby to separate the centers of the dynamic pressure to both sides of the slider as far as possible, so that the rolling of the slider is stabilized.

A third object of this invention is to provide a flying head slider wherein an inclined plane is formed between tapered parts at both widthwise ends of the slider, with a taper angle equal to or smaller than that of an inclined plane determining the flying characteristic of the slider, thereby setting the peak values of the dynamic pressure of the air entering between the slider and disk to increase, so that the rolling and pitching of the slider are stabilized.

The above and further objects and features of the invention will more fully be apparent from the following detailed description with accompanying drawings.

DESCRIPTION OF THE PREFERRED EMBODIMENTS

A flying head slider of this invention will be discussed hereinbelow with reference to the accompanying drawings showing preferred embodiments thereof.

Figure 3:
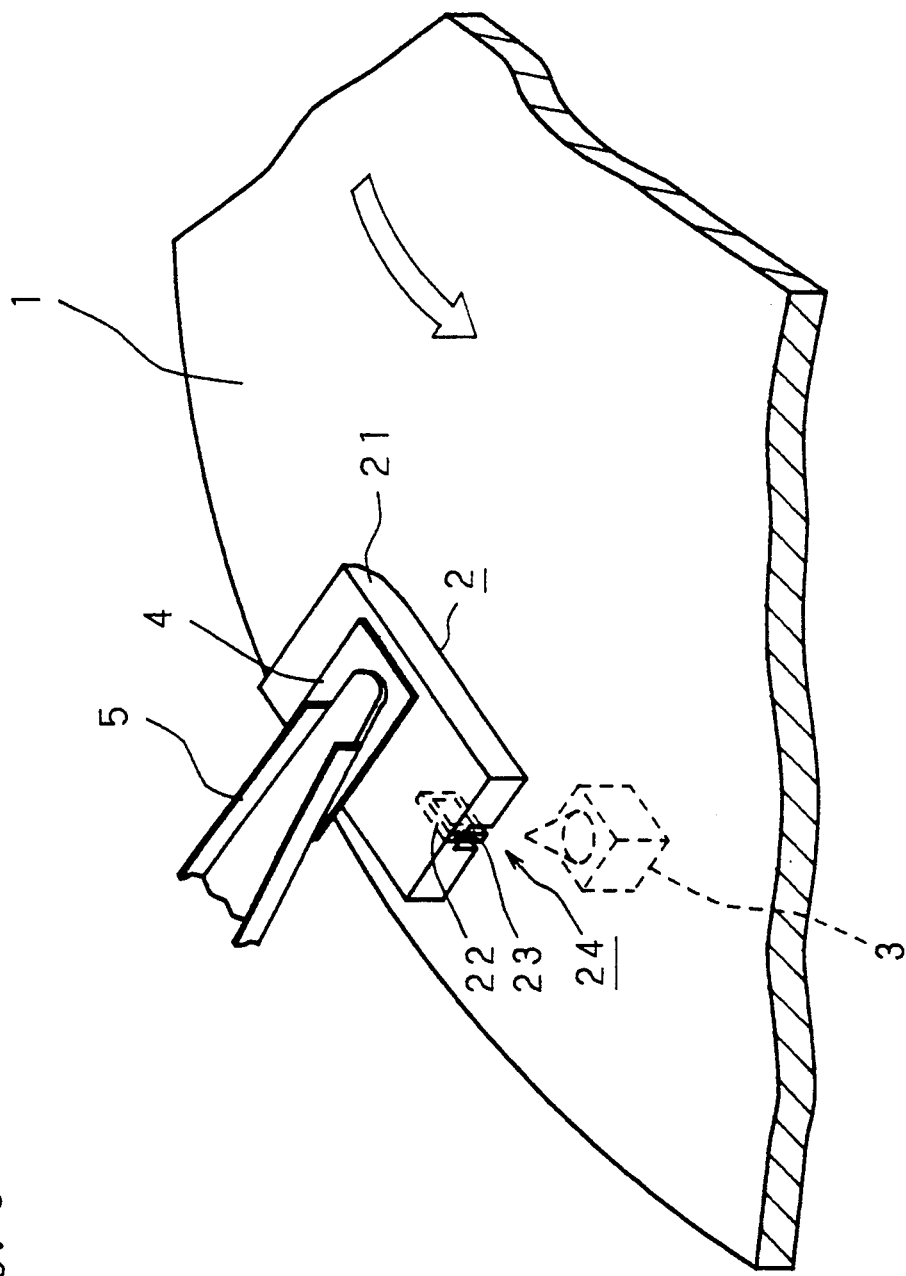
FIG. 3 is an enlarged perspective view showing the structure of a head and its peripheral in a magneto-optical disk drive employing a flying head slider according to this invention.

Referring to an enlaged perspective view of FIG. 3, there is shown the structure of a magnetic head and its peripherals of a magento-opetical disk drive employing a flying head slider of this invention. In FIG. 3, a magnetic head 2 is provided to face the upper surface of a magneto-optical disk 1 (referred to as a disk hereinafter), flying at several $\mu$m to ten and several $\mu$m height by the dynamic pressure generated by the rotation of the disk 1 in a direction shown by a white arrow. The magnetic head 2 is a rectangular flat plate and is constituted of a slider 21 thinned approximately severa $\mu$m on the leading edge side and a bulk head 24 as a bias magnetic field generating unit. The bulk head 24 comprises a U-shaped core 22 buried at the central and of the trailing edge side of the slider 21 and a coil 23 wound the curved portion of the core 22. The slider 21 of the magnetic head 2 is fitted to a supporting arm 5 via a gimbal spring 4, so that the magnetic head 2 is able to pitch and roll around a pivot (not shown) formed in the gimbal spring 4. Accordingly, the magnetic head 2 can follow up the deflection at the surface of the disk 1 by this rocking of the magnetic head 2. Moreover, the magnetic head 2 is movable in the radial direction of the disk 1 by advance and retreat of the supporting arm 5.

An optical head 3 is provided beneath the lower surface of the disk 1, confronting where a bias magnetic field is generated by the bulk head 24. The optical head 3 heats the bias magnetic field generating area when recording or erasing data thereby to form a reversed magnetic domain.

Figure 4A:
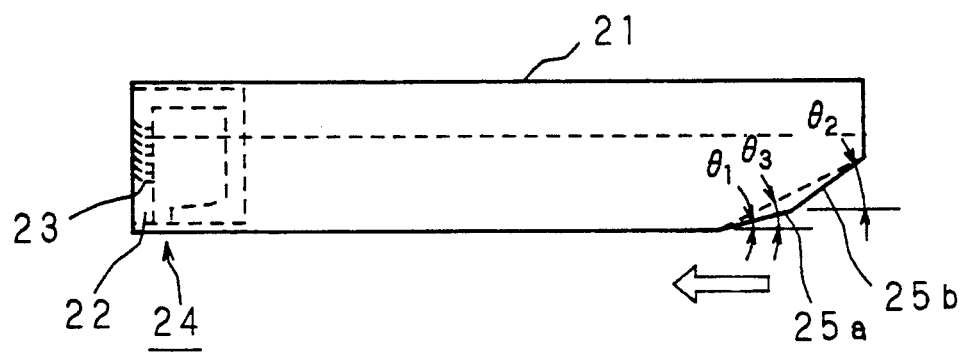
FIGS. 4(a) and 4(b) are a side sectional view and a bottom view of a flying head slider according to a first embodiment of this invention.
Figure 4B:
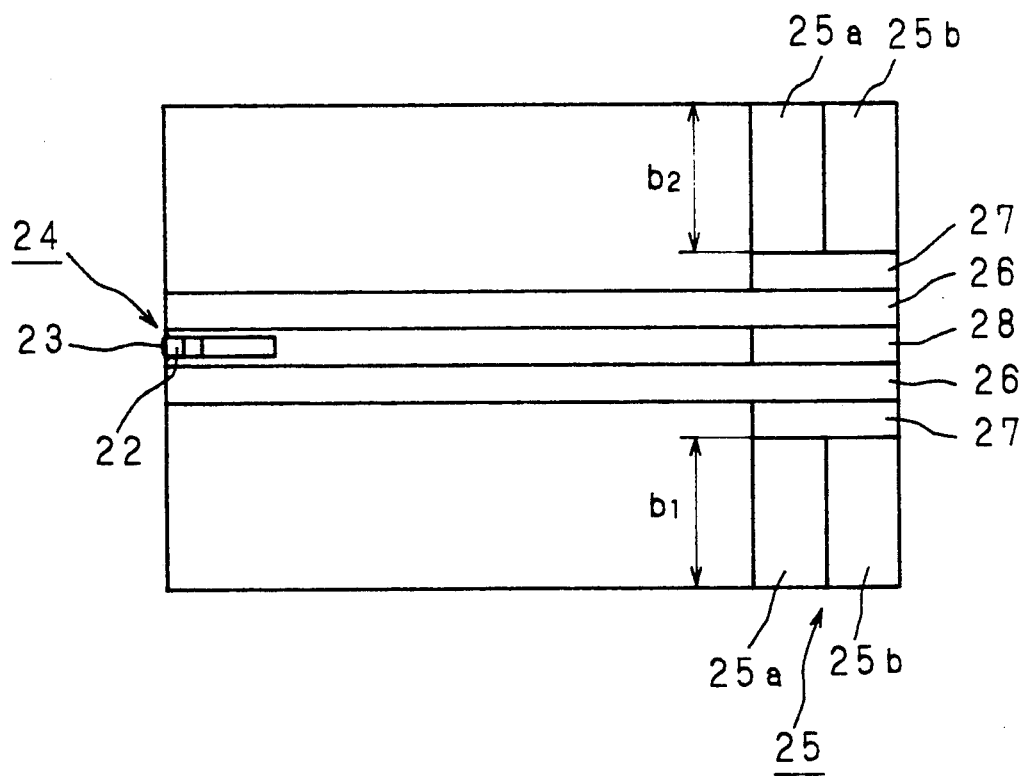

FIG. 4 is an enlarged view showing the structure of the slider 21 according to one embodiment of this invention, more specifically, FIG. 4(a) is a side sectional view and FIG. 4(b) is a bottom view. The slider 21 is a flat plate of 10 mm long, 8 mm wide and about 1 mm thick, beneath which enters the air caused by the rotation of the disk 1 from a longitudinal direction shown by a while arrow. First inclined planes 25a, 25a are formed at a taper angle $\theta 1$ ($\approx 14.5$ mrad) from a position about 0.8 mm away from an end face at the leading edge of the slider 21 towards the trailing edge to a position about 0.4 mm away from the end face towards the trailing edge. From this position toward the end face, second inclined planes 25b, 25b are formed at a taper angle $\theta 2$ ($\approx 29$ mrad). These inclined surfaces 25a, 25a, 25b, and 25b define a tapered part 25. The lengths b1 and b2 (b1$\approx$b2) of the first or second inclined plane 25a, 25b in a widthwise direction of the slider 21 from widthwise ends are respectively longer enough than ¼ the width of the slider 21. The first and second inclined planes 25a, 25b are not formed in the widthwise center of the slider, but formed two grooves 26, 26 across longitudinal length of the slider 21 and three relief surfaces 27, 27 and 28 at a taper angle $\theta 3$ ($\approx 21.8$ mrad). Since these grooves 26, 26 do not generate the dynamic pressure, the dynamic pressure generating areas are parted on the left and right of the flowing direction of the air, thus improving the balance between the left and right at flying.

Figure 5:
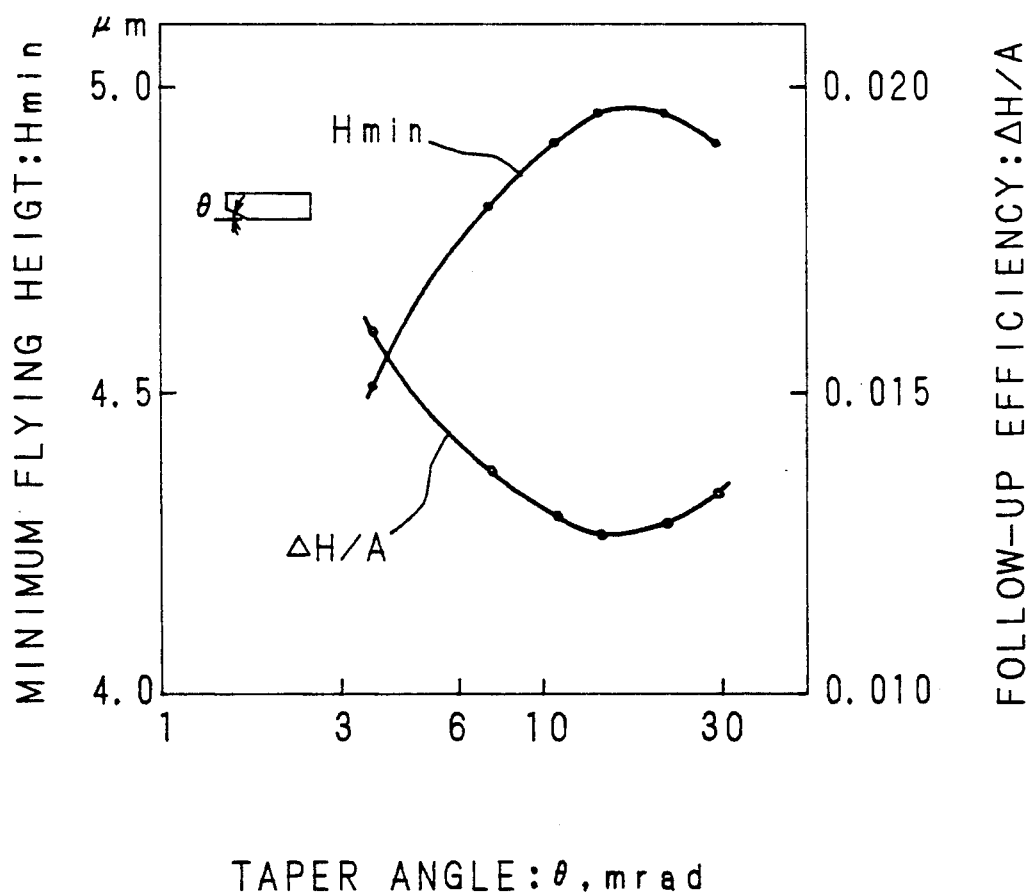
FIG. 5 is a graph showing the relation among the taper angle of an inclined plane, the follow-up efficiency and the minimum flying height of the flying head slider.

Further, the bulk head 24 is embedded in the trailing edge of the slider 21 as mentioned earlier. When the slider 21 in the above-discussed structure flies in consequence of the rotation of the disk 1 and an end of the slider touches the disk 1 owing to the pitching for following the deflection of the surface of the disk, the foreign substance hardly adheres to the first inclined planes 25a, 25a, but adheres to the second inclined planes 25b, 25b. The flying characteristic of the slider at this time is determined mainly by the first inclined planes 25a, 25a not by the second inclined planes 25b, 25b. Since the shapes of the first inclined planes 25a, 25a are approximately equal to those before the adhesion of the foreign substance 10, the flying characteristic of the slider 21 does not change. FIG. 5 is a graph indicating the relation among the taper angle of the inclined planes, follow-up efficiency of the slider and minimum flying height. The taper angle $\theta$ is represented on the abscissa, the follow-up efficiency $\Delta H/A$ on the right of the ordinate, and the minimum flying height Hmin on the left of the ordinate. The minimum flying height Hmin is a representative index of the flying characteristic, that is, indicates the flying height ($\mu$m) at the trailing edge of the slider from the surface of the disk 1. The follow-up efficiency is obtained by dividing the varying quantity of the flying height $\Delta H$ of the flying height by the surface deflection quantity A. In such an example as the instant embodiment that the flying head slider is driven in an open state, it is necessary to decide the taper angle $\theta$ of the inclined planes where the flying height is as high as possible and the follow-up efficiency $\Delta H/A$ as small as possible. To this end, as is apparent from FIG. 5, at the taper angle in a relatively wide range from 6 to 30 mrad, the flying height is larger with a smaller change in the follow-up efficiency. Accordingly, the taper angles $\theta 1$, $\theta 2$ and $\theta 3$ are respectively set to be 14.5, 29.0 and 21.8 mrad according to the present first embodiment.

Now, a second embodiment of this invention will be discussed hereinafter.

Figure 6A:
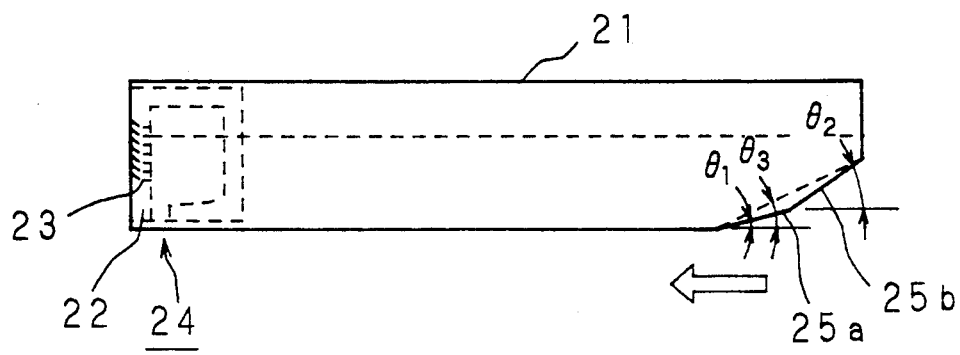
FIGS. 6(a) and 6(b) are a side sectional view and a bottom view of a flying head slider according to a second embodiment of this invention.
Figure 6B:
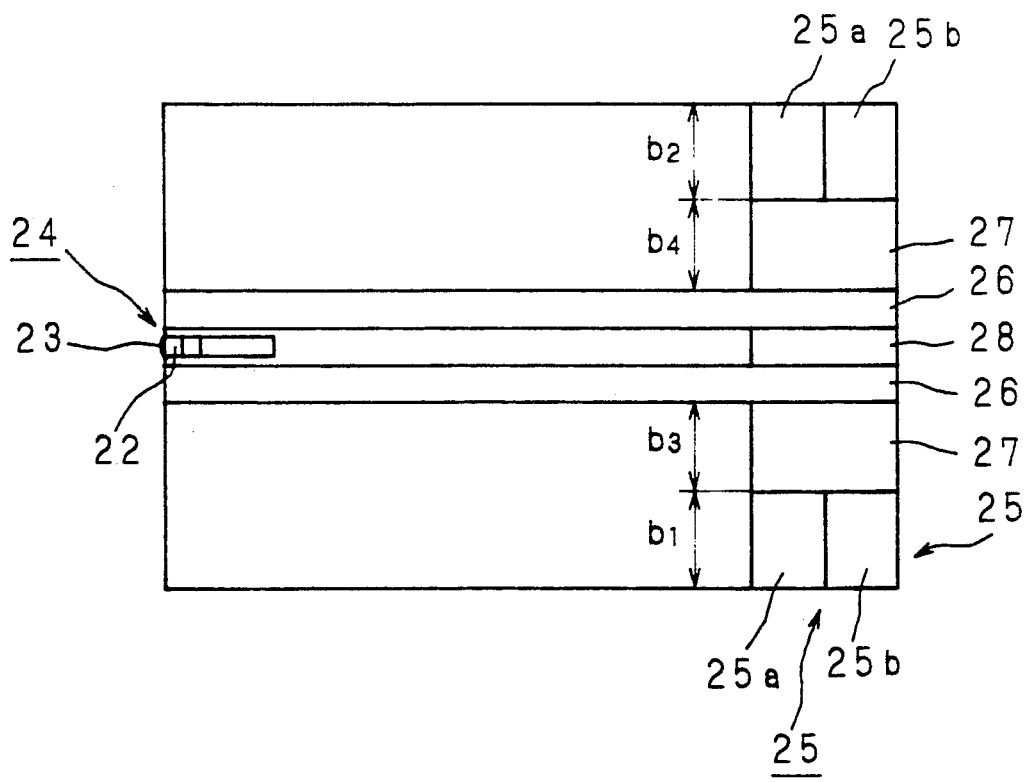

In FIG. 6, the structure of a slider 21 according to the second embodiment of this invention is shown in an enlarged scale. FIG. 6(a) is a side sectional view and FIG. 6(b) is a bottom view of the slider. What is different from the first embodiment is that the length in the widthwise direction of the slider b1 or b2 (b1≈b2) of the first and second inclined planes 25a, 25b is approximately equal to the length in the widthwise direction of the slider b3 or b4 (b3≈b4) of the relief planes 27. Therefore, the lengths b1, b2 shown in FIG. 6 are shorter than the lengths b1, b2 shown in FIG. 4. Accordingly, the centers of the dynamic pressure are more outward in the widthwise direction of the slider 21 in comparison with the first embodiment, so that the stability of the slider 21 during the rolling is improved. Since the other structure as well as the flying characteristic against a foreign substance is approximately the same as in the first embodiment, the description thereof will be abbreviated.

Although the taper angles $\theta 1$, $\theta 2$, $\theta 3$ are set to be 14.5, 29.0, 21.8 mrad respectively in the foregoing first and second embodiments, they are not restricted to these values according to this invention. Any combination of the taper angles may be possible so long as the angles are in the range from 6 to 30 mrad while satisfying $\theta 2 > \theta 3 > \theta 1$. Moreover, although the length b1 of the inclined planes is set approximately equal to the length b3 of the relief planes 27 according to the second embodiment, the length b3 may be optionally determined so long as it is smaller than the length b1 set in the first embodiment.

A third embodiment of this invention will be depicted hereinafter.

Figure 7A:
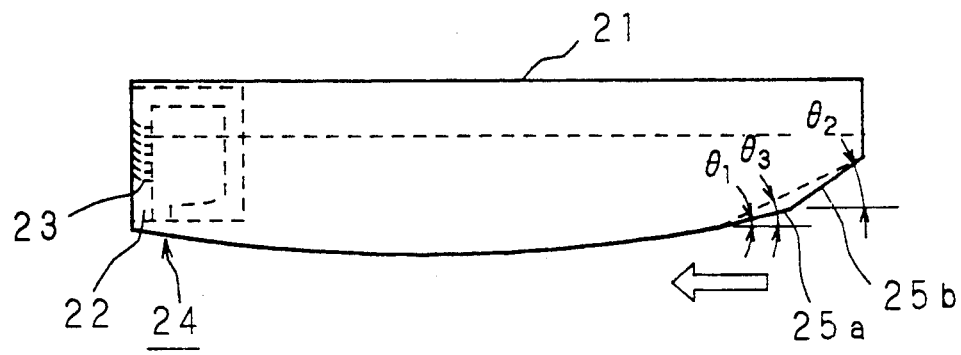
FIGS. 7(a) and 7(b) are a side sectional view and a bottom view of a flying head slider according to a third embodiment of this invention.
Figure 7B:
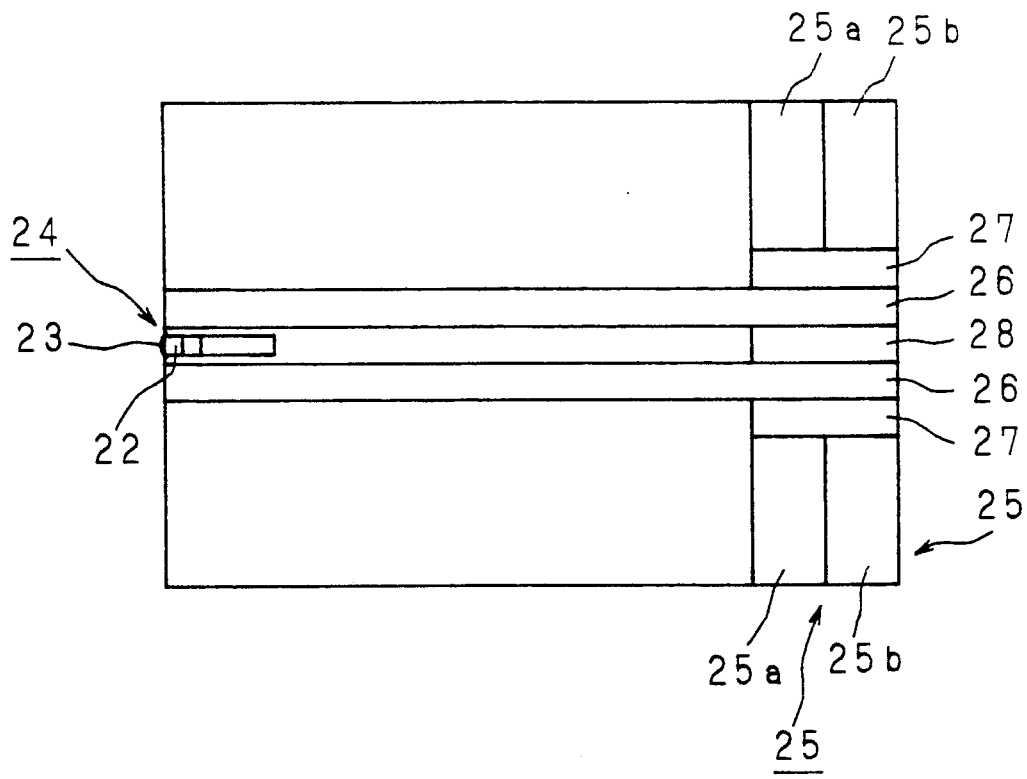

FIG. 7 illustrates the structure of a slider 21 according to the third embodiment of this invention. FIG. 7(a) is a side sectional view and FIG. 7(b) is a bottom view of the slider. In the slider 21 of this embodiment, the lower surface from an end of the first inclined surfaces 25a to an end face at the trailing edge of the slider 21 is rounded out in arcs. This is intended to obtain a higher flying height. Although the working efficiency of this slider is lowered and the manufacturing cost is increased as compared with the second embodiment, a higher flying height can prevent the adhesion of dust more efficiently. The other structure is the same as in the second embodiment and the description thereof will be abbreviated here.

Figure 8A:
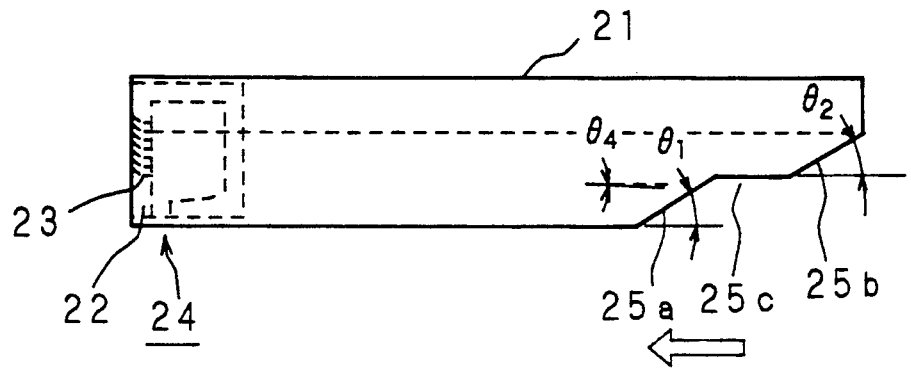
FIGS. 8(a) and 8(b) are a side sectional view and a bottom view of a flying head slider according to a fourth embodiment of this invention.
Figure 8B:
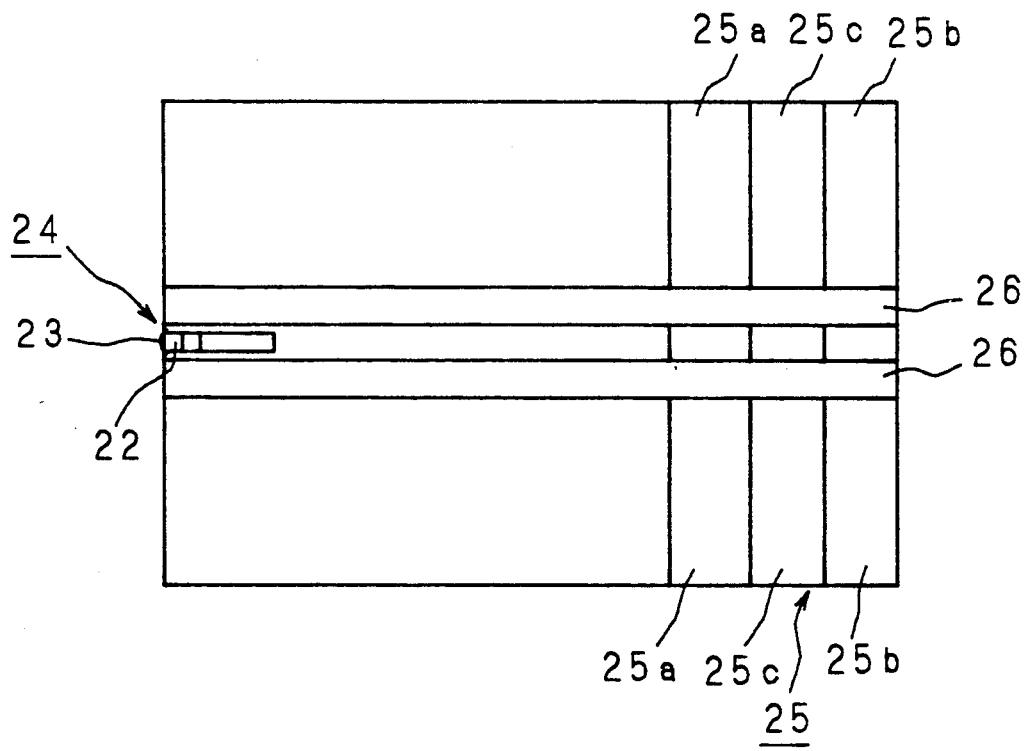

A fourth embodiment of this invention will be depicted with reference to FIG. 8 which is an enlarged view of a slider 21. FIG. 8(a) is a side sectional view and FIG. 8(b) is a bottom view of the slider 21. Three inclined planes 25a, 25b, 25c are formed sequentially from below, with the respective taper angles being set $\theta 1 \approx \theta 2 \approx 14.5$ mrad and $\theta 4 \approx 0$. The foreign substance mainly adheres to the second inclined planes 25b. Accordingly, the flying characteristic of the slider 21 is determined substantially by the first inclined planes 25a. According to the fourth embodiment, since the taper angle $\theta 1$ is set in the proper range as mentioned earlier, and furthermore, the third inclined planes 25c are formed between the first and second inclined planes 25a and 25b, the foreign substance hardly adheres to the first inclined planes 25a, whereby the flying characteristic of the slider 21 is kept unchanged.

Although the taper angles $\theta 1$ and $\theta 2$ hold the relation $\theta 1 = \theta 2 = 14.5$ mrad in the above fourth embodiment, this invention is not restricted to this. $\theta 1$, $\theta 2$ may be any values so long as $6 \leq \theta 1$, $\theta 2 \leq 30$ mrad.

In addition, although the lengths of the inclined planes 25a, 25c, 25b in the air flowing direction in the fourth embodiment are approximately equal to each other, they may be different from each other.

Figure 9A:
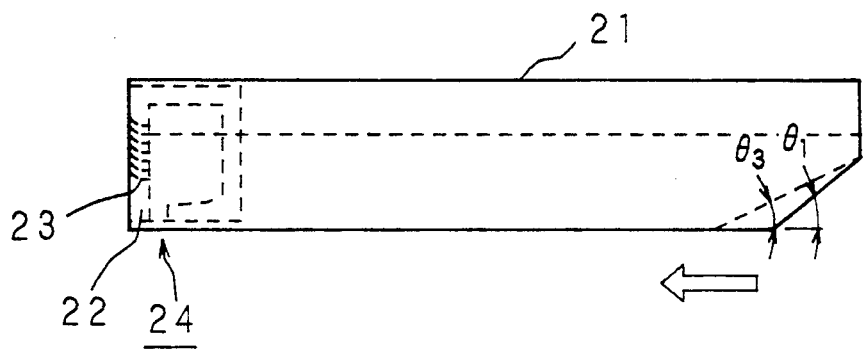
FIGS. 9(a) and 9(b) are a side sectional view and a bottom view of a flying head slider according to a fifth embodiment of this invention.
Figure 9B:
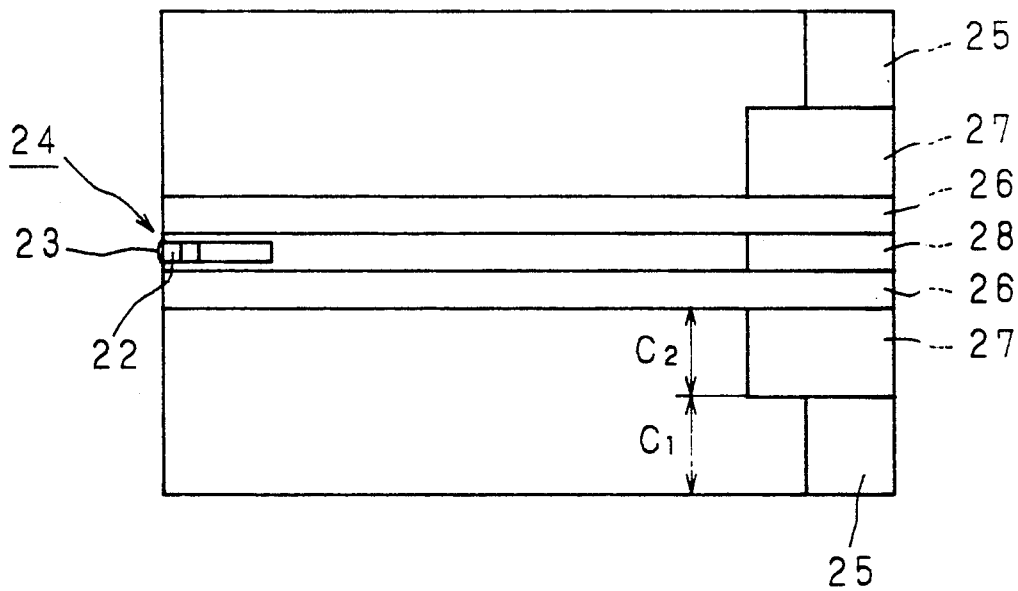

A slider according to a fifth embodiment of this invention is shown in FIG. 9, FIG. 9(a) being a side sectional view and FIG. 9(b) being a bottom view. The slider 21 of FIG. 9 is a flat plate of 10 mm long, 8 mm wide and approximately 1 mm thick. The air enters beneath the slider 21 in a direction shown by a white arrow due to the rotation of the disk 1. Tapered parts 25 are formed on both sides of the slider 21 from a position about 0.4 mm away from an end face at the leading edge of the slider 21 towards the trailing edge to the end face at a taper angle $\theta 1$ ($\approx 29.5$ mrad) and in length C1 in a widthwise direction. A relief plane 27 is formed between the tapered parts 25 at a taper angle $\theta 3$ ($\approx 14.5$ mrad) and in length C2 (C2≈C1) in the widthwise direction. Besides, two grooves 26, 26 are formed across the longitudinal length of the slider 21 in the widthwise central part thereof.

In the slider 21 of the above-described structure in the fifth embodiment, since the tapered parts 25 determining the flying height of the slider are provided on both sides of the slider 21, the centers of the dynamic pressure at places out of the tapered parts 25 toward the trailing edge go more outward than in the conventional slider, thereby improving the reliability of the slider during the rolling.

In the fifth embodiment, although the taper angles of the tapered parts 25 and relief planes 27 are 29 mrad and 14.5 mrad, respectively, the values may be any so long as the taper angle of the tapered parts is larger than that of the relief planes in the range from 6 to 30 mrad.

Moreover, although the widths C1 and C2 are approximately the same in the fifth embodiment, they may by any optional values.

Figure 10A:
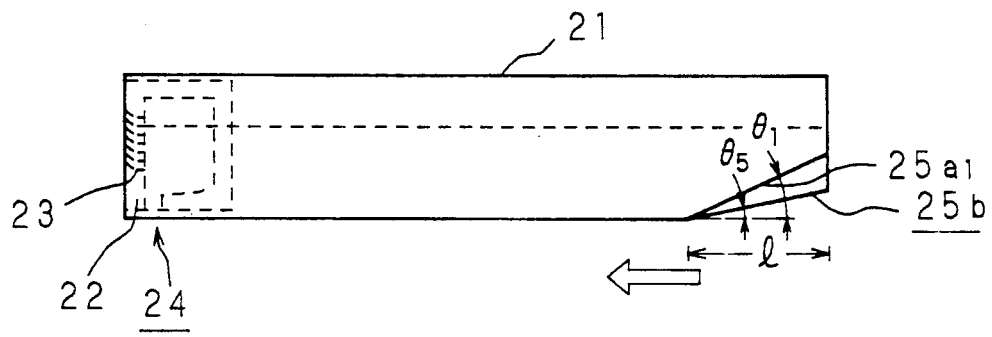
FIGS. 10(a) and 10(b) are a side sectional view and a bottom view of a flying head slider according to a sixth embodiment of this invention.
Figure 10B:
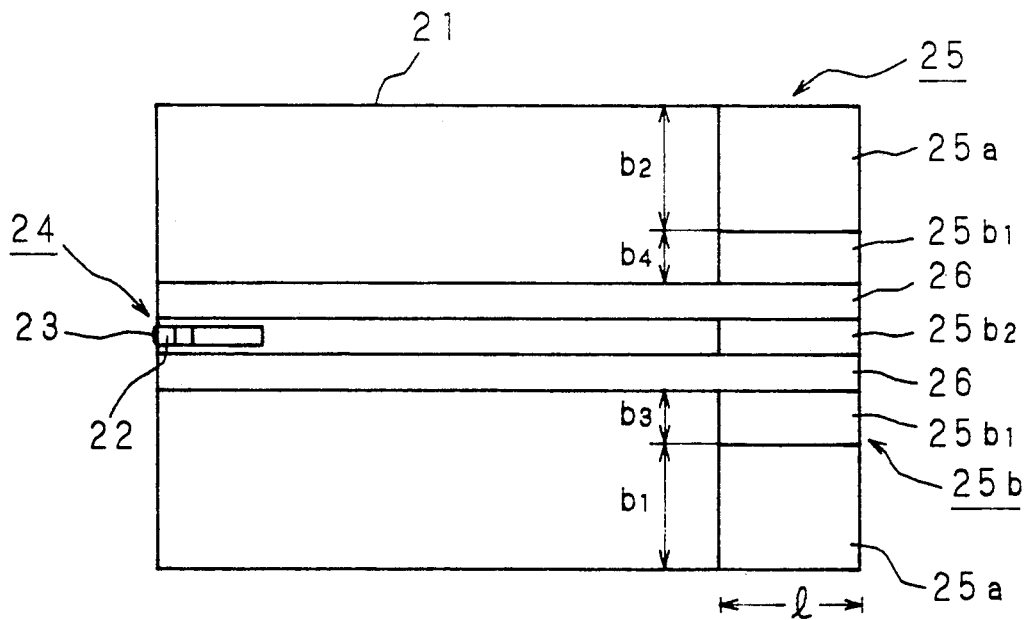

FIG. 10 shows a slider according to a sixth embodiment of this invention on an enlarged scale. FIG. 10(a) is a side sectional view and FIG. 10(b) is a bottom view. The slider 21 is a flat plate of 10 mm long, 8 mm wide and about 1 mm thick. The air enters beneath the slider 21 from a direction shown by a white arrow owing to the rotation of the disk 1. A tapered part 25 is formed from a first position 1 ($\approx 0.76$ mm) away from an end face at the leading edge of the slider towards the trailing edge to the end face. The tapered part 25 is constituted by first inclined planes 25a, 25a at a taper angle $\theta 1$ ($\approx 14.5$ mrad) and with lengths b1, b2 ($\approx 2.07$ mm) in a widthwise direction of the slider and a second inclined plane 25b formed between the first inclined surfaces 25a and 25a at a taper angle $\theta 5$ (=7.25 mrad). Further, the second inclined plane 25b includes first parts 25b1, 25b1 with lengths b3, b4 (=1.03 mm) in the widthwise direction of the slider and a second part 25b2 in the middle between the first parts 25b1. There are two grooves 26, 26 each between the first part 25b1 and second part 25b2 of the second inclined plane 25b. The grooves 26, 26 extend across the longitudinal length of the slider 21. Moreover, a bulk head 24 comprising a core 22 and a coil 23 is buried at the central trailing edge of the slider 21.

As is discussed hereinbefore, in the slider 21 of the sixth embodiment, since the tapered part 25 which determines the flying characteristic of the slider 21 is formed approximately across the width of the slider, and at the same time, it is constituted by the first inclined planes 25a, 25a and the smoother second inclined plane 26b than the first inclined planes 25a, 25a, the centers of the dynamic pressure at places out of the tapered part 25 toward the trailing edge are found three, i.e., two approximately on the central axis of each width b1, b2 of the first inclined planes 25a, 25a and one approximately on the central axis between the widths b3, b4 of the second inclined plane 25b. Accordingly, the stability during the rolling of the slider 21 improves mainly because of the centers of the dynamic pressure relevant to the first inclined planes 25a, 25a.

The total volume of the dynamic pressure is increased as a whole by the dynamic pressure generated at the above three points. Therefore, when the air enters beneath the slider 21, the slider 21 flies higher at the leading edge than at the trailing edge, thereby enlarging a pitch angle defined between the slider 21 and disk 1 when the slider is flying. Accordingly, even when the disturbance against the disk occurs, the squeeze effect is more effectively achieved, and the stability of the slider during the pitching improves.

Figure 11A:
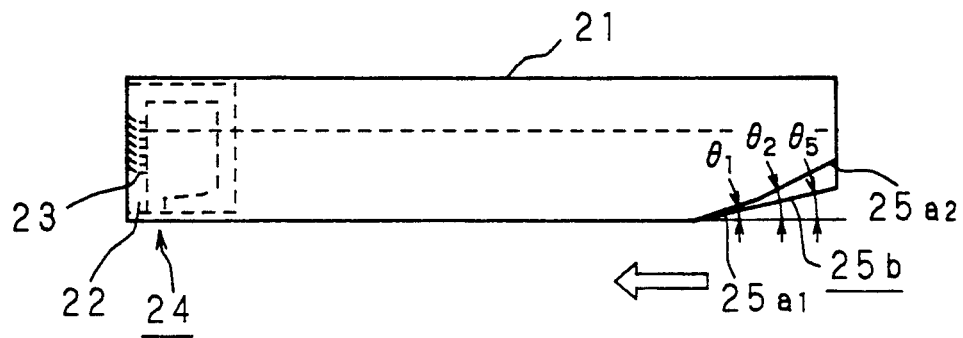
FIGS. 11(a) and 11(b) are a side sectional view and a bottom view of a flying head slider according to a seventh embodiment of this invention.
Figure 11B:
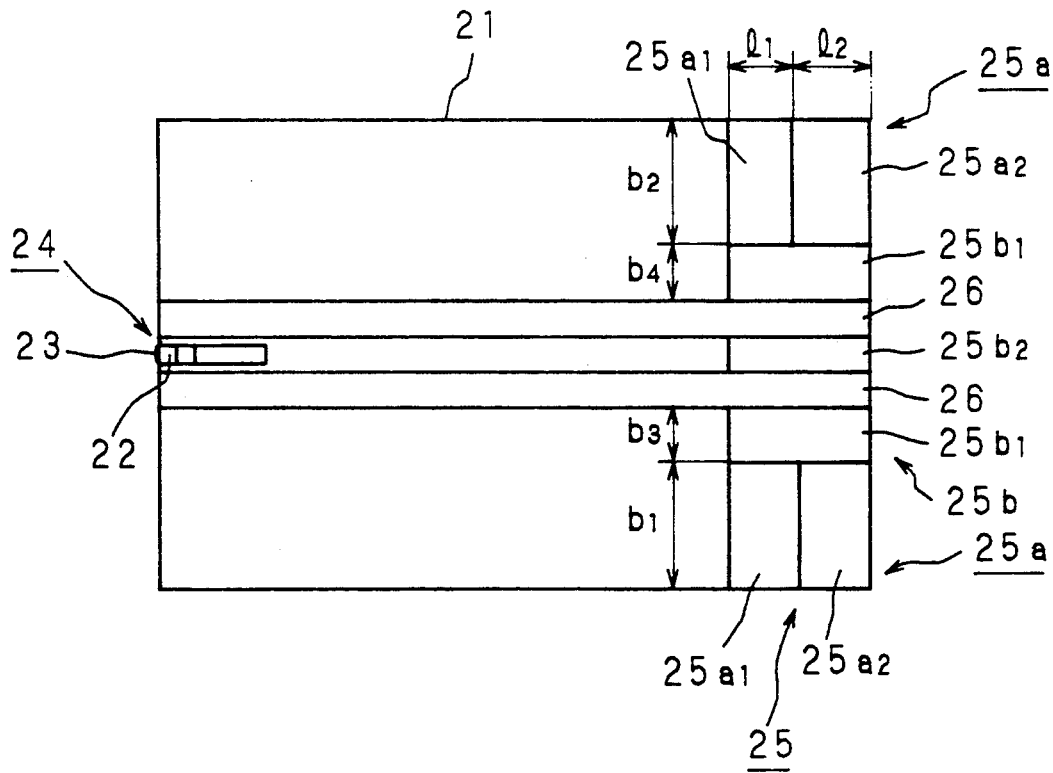

FIG. 11 is an enlarged view of a slider according to a seventh embodiment of this invention. FIG. 11(a) is a side sectional view and FIG. 11(b) is a bottom view of the slider. According to this seventh embodiment, each of the first inclined planes 25a, 25a is constituted by a first part 25a1 and a second part 25a2 each having length b1 or b2 ($\approx 2.07$ mm) in a widthwise direction of the slider. The first part 25a1 is formed at a taper angle $\theta 1$ (=14.5 mrad) from the above-mentioned first position, and the second part 25a2 adjoins the first part 25a1 and formed at a taper angle $\theta 2$ ($\approx 29$ mrad) from the aforementioned second position. The second inclined plane 25b is in the same structure as in the sixth embodiment shown in FIG. 10.

A modification of the seventh embodiment will be described below.

Figure 12A:
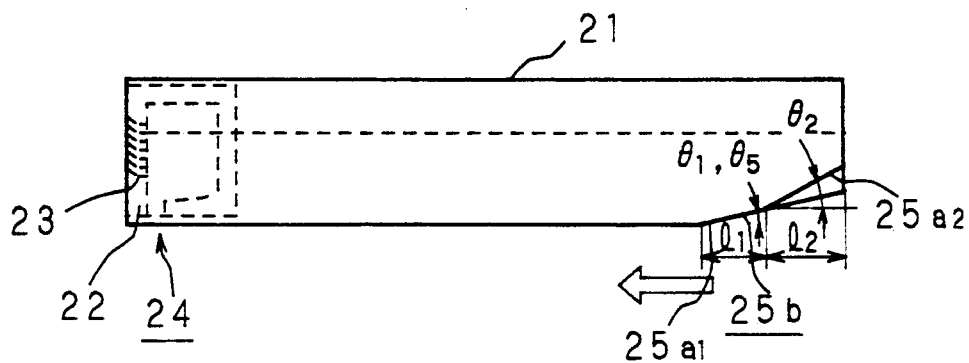
FIGS. 12(a) and 12(b) are a side sectional view and a bottom view of a flying head slider according to a modification of the seventh embodiment of this invention.
Figure 12B:
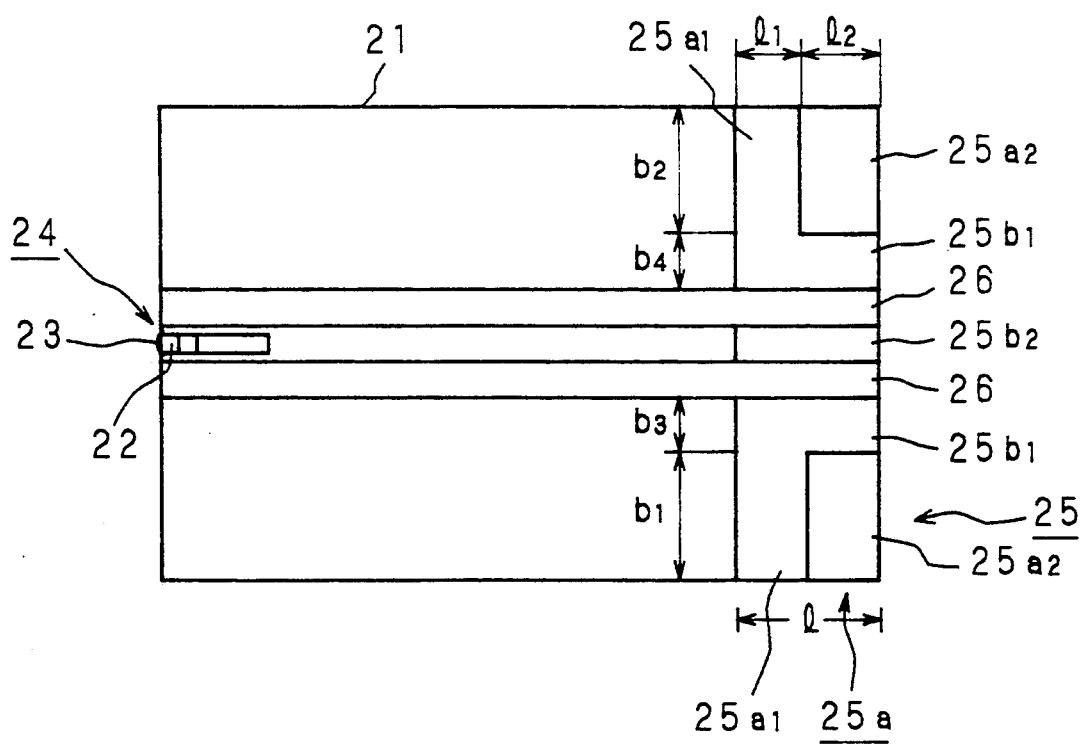

FIG. 12 shows a modified slider of FIG. 11. FIG. 12(a) is a side sectional view and FIG. 12(b) is a bottom view. According to this modification, the second inclined plane 25b is formed at a taper angle $\theta 5$ (=14.5 mrad) from the first position the distance l ($\approx 0.76$ mm) away from an end face at the leading edge towards the trailing edge. On the other hand, the first parts 25a1, 25a1 of the first inclined planes 25a, 25a are formed at a taper angle $\theta 1$ (=14.5 mrad) from the first position towards the leading edge to the second position spaced l1 ($\approx 0.38$ mm). The second parts 25a2, 25a2 are formed at a taper angle $\theta 2$ ($\approx 25$ mrad) from the second position to the end face at the leading edge with widthwise lengths b1, b2 ($\approx 2.07$ mm) and a longitudinal length l2 ($\approx 03.8$ mm). The other structure is the same as in the sixth embodiment of FIG. 10.

According to the modification shown in FIG. 12 as well, the stability of the slider during the rolling and pitching improves similar to the sixth embodiment.

As is clear from the above the seventh embodiment, since the first inclined plane 25a is formed of two parts 25a1 and 25a2, not only the effects obtained in the sixth embodiment are achieved, but the foreign substance referred to in the first through fourth embodiments adheres to the second part 25a2, not adhered to the first part 25a1. Therefore, the stability of the slider is maintained even by the adhesion of the foreign substance.

Although two grooves and three flat planes, with the head arranged at the central narrowest plane are formed in the foregoing embodiments, this invention is not restricted to such an arrangement as above, and it is needless to say that it may be possible to provide a single or no groove and, two or one flat plane, and to arrange the head in either of the flat planes.

A further modification of the seventh embodiment will be discussed hereinafter.

Figure 13A:
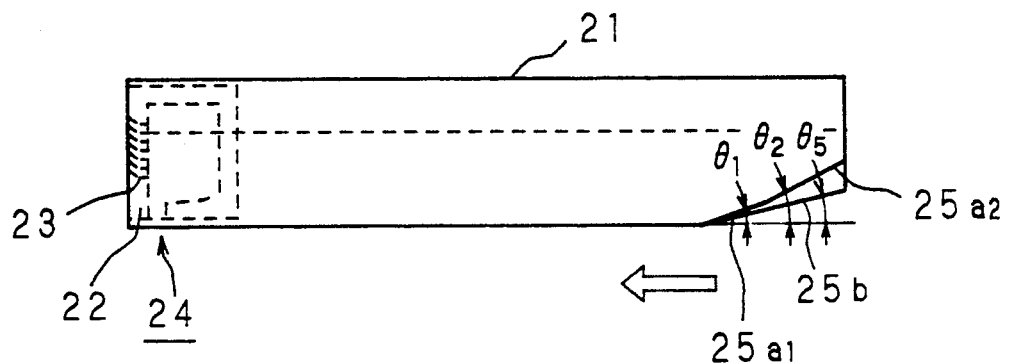
FIGS. 13(a) and 13(b) are a side sectional view and a bottom view of a flying head slider according to a further modification of the seventh embodiment of this invention.
Figure 13B:
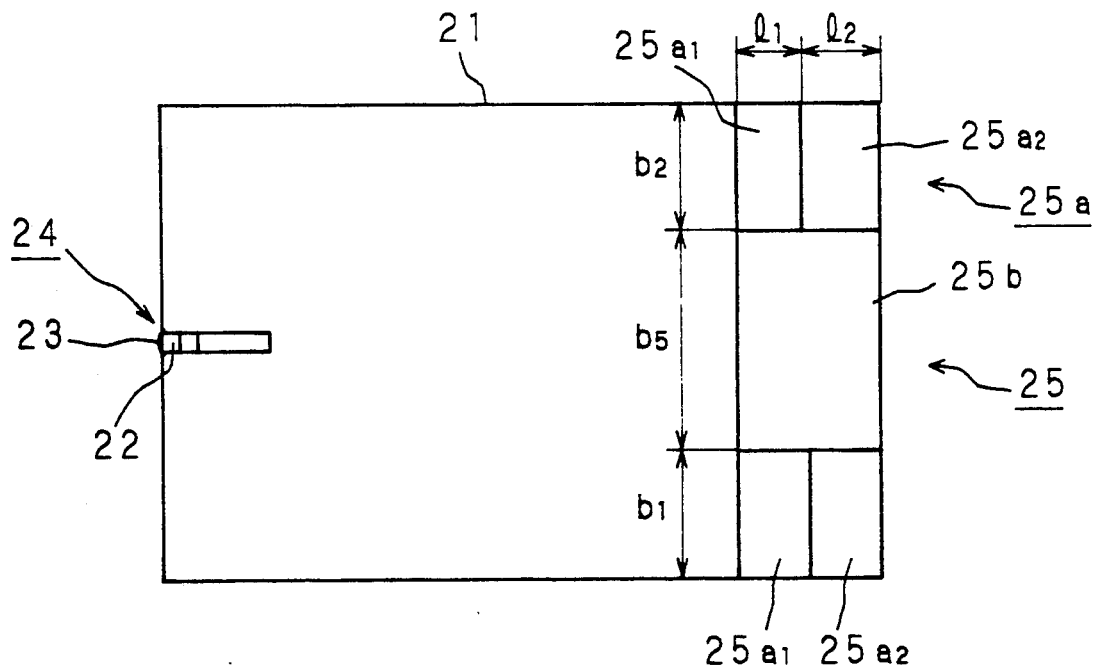

A modified slider is shown in FIG. 13, FIG. 13(a) being a side sectional view and FIG. 13(b) being a bottom view thereof. The second inclined plane 25b is totally flat according to the modified slider of FIG. 13, with no grooves. A slider without grooves flies higher than slider with grooves when the outer dimensions are the same. The grooves are essentially provided to suppress the generation of the dynamic pressure and to part the dynamic pressure generating areas on the right and left of the flowing direction of the air so as to improve the balance of the right and left when the slider is flying. However, the balance improves even without the grooves when the tapered planes are formed on both sides of the slider 21 as in the fifth through seventh embodiments. The balance is better as compared with a single tapered slider.

The other structure and operation of the slider in FIG. 13 are the same as the seventh embodiment, and therefore the description thereof will be abbreviated.

Now, the follow-up efficiency during the rolling and pitching of the slider according to the fifth through seventh embodiments and modifications of the seventh embodiment will be explained.

Figure 1:
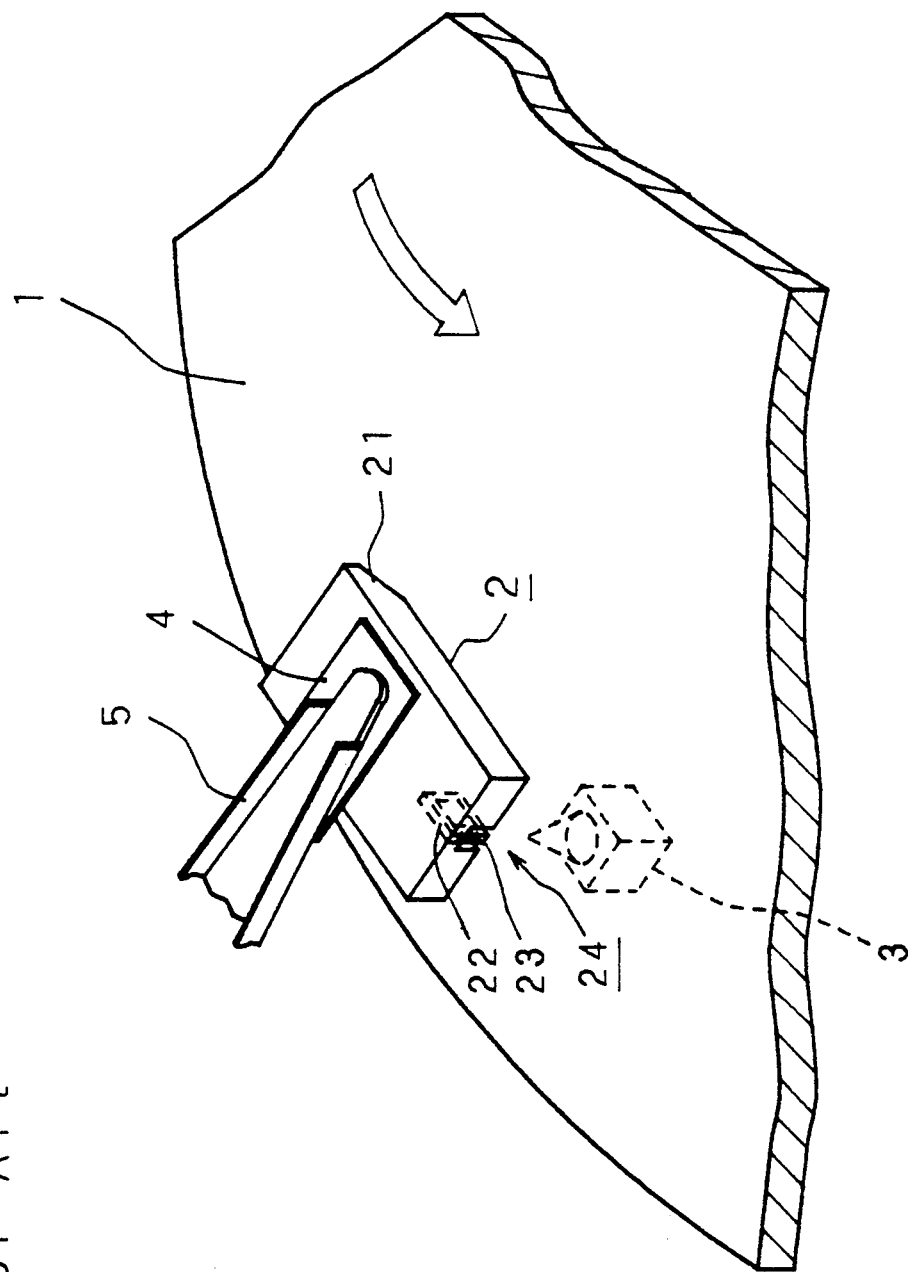
FIG. 1 is an enlarged perspective view showing the structure of a head and its peripherals in a magneto-optical disk drive employing a conventional flying head slider.
Figure 2A:
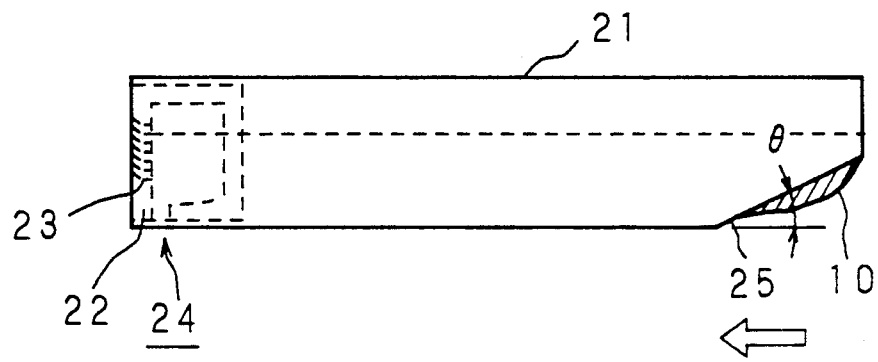
FIGS. 2(a) and 2(b) are a side sectional view and a bottom view of the conventional flying head slider.
Figure 2B:
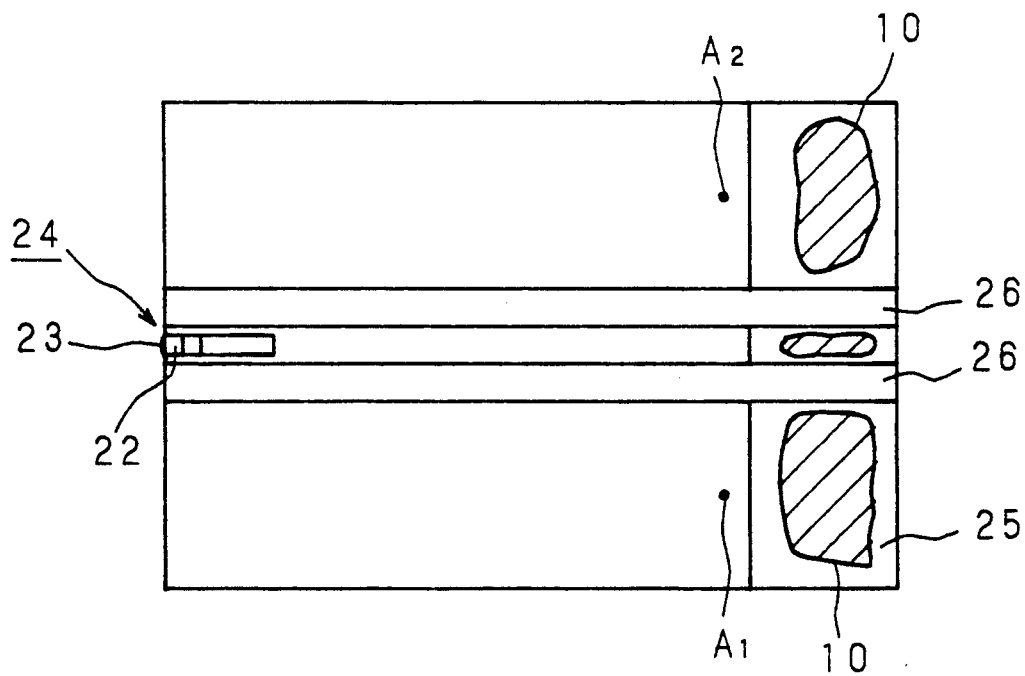
Figure 14:
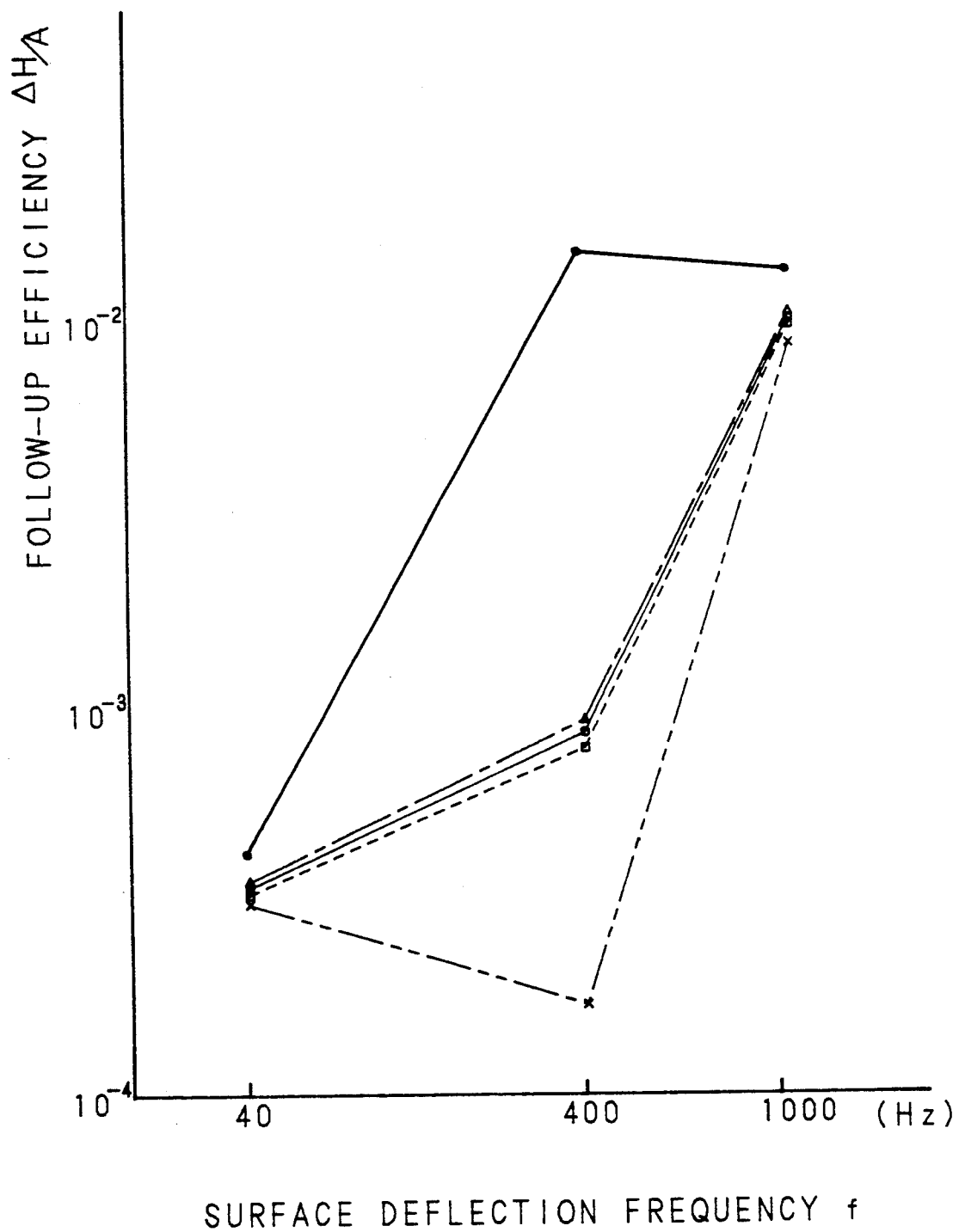
FIG. 14 is a graph showing the relation between a frequency f of the surface deflection and the follow-up efficiency $\Delta H/A$ during the rolling motion of the slider.
Figure 15:
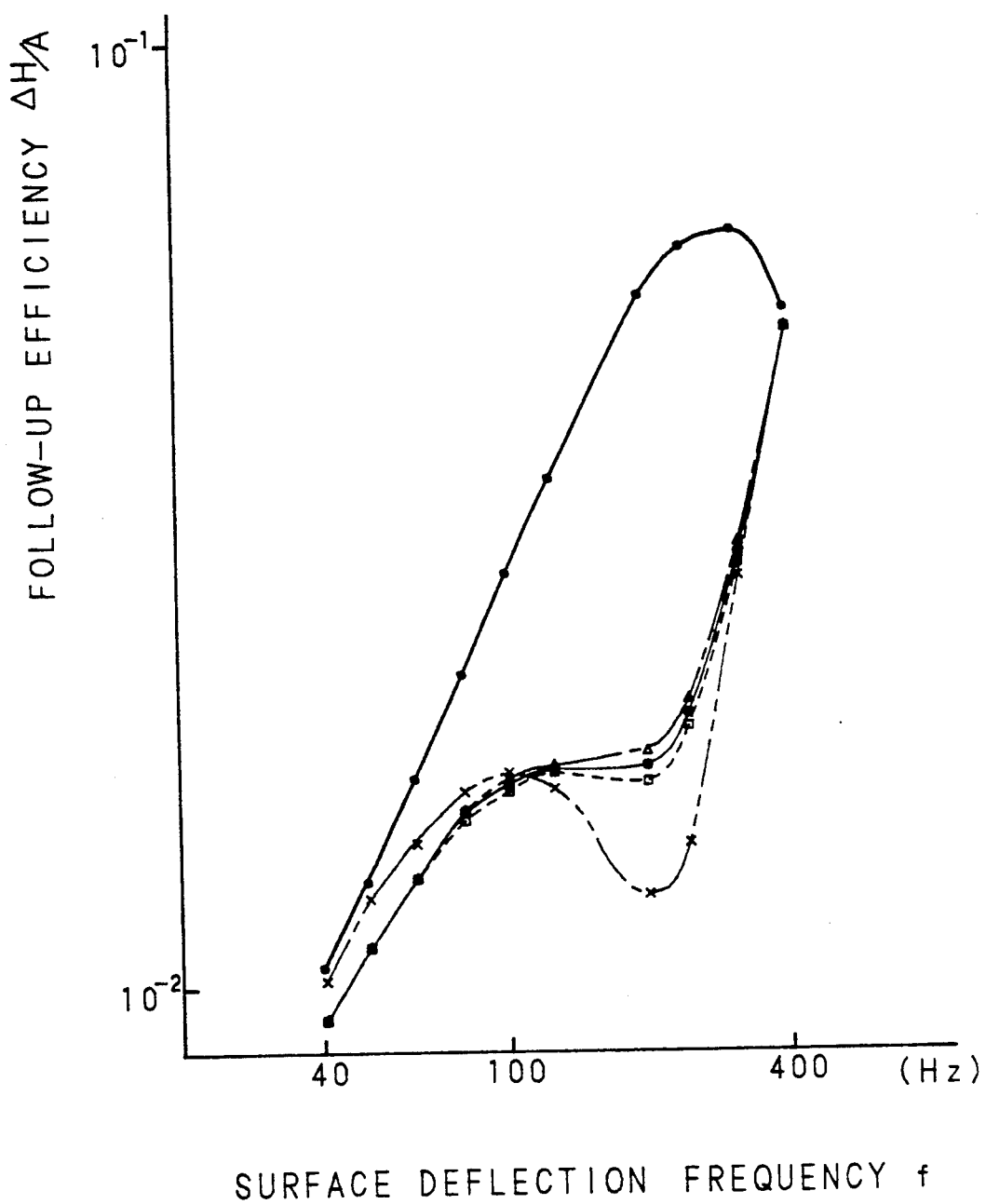
FIG. 15 is a graph showing the relation between a frequency f of the surface deflection and the follow-up efficiency $\Delta H/A$ during the pitching motion of the slider.

In FIGS. 14 and 15, the relation between the frequency f of the surface deflection and the follow-up efficiency $\Delta H/A$ during the rolling or pitching is indicated in a graph. The frequency f(Hz) of the surface deflection is represented on the abscissa and the follow-up efficiency ΔH/A on the ordinate. A thick solid line in the graphs is related to the conventional magnetic head slider shown in FIG. 2 a two-dot chain line related to the flying head slider in the fifth embodiment of FIG. 9, a thin solid line related to the flying head slider of the sixth embodiment of FIG. 10, a one-dot chain line related to the flying head slider of the seventh embodiment of FIG. 11 and a broken line related to the flying head slider of FIG. 12 which is the modification of the seventh embodiment. The peripheral speed of the disk is 13.1 m/sec.

As is apparent from FIG. 14, the rolling characteristic of the flying head slider of the fifth embodiment designated by the two-dot chain line remarkably improves all over the whole frequency zone because of the tapered parts 25, 25 formed on both sides thereof. However, as shown in FIG. 15 the pitching (undulation) characteristic in the flying head slider of the fifth embodiment greatly improves in a higher frequency zone not lower than 100 Hz, but slightly in a lower frequency zone from 40 to 100 Hz as compared with the prior art. Therefore, the flying head slider of the fifth embodiment is not so good in terms of the total balance.

On the other hand, the follow-up efficiency during the rolling and pitching is favorably balanced all over the total frequency range in the flying head sliders of the sixth, seventh and modified embodiments shown by the thin solid line, broken line and one-dot chain line, respectively. Therefore, the stability of the slider during rolling and pitching improves.

Though the taper angle of the first inclined plane is set to be 14.5 mrad or 29 mrad, and that of the second inclined plane is set to be 7.25 mrad or 14.5 mrad in the sixth and seventh embodiments, the taper angle of the first and second inclined planes may be set at any angle in the range from 6 to 30 mrad so long as the taper angle of the former is larger than that of the latter.

Moreover, the magnetic head is a bulk head in the foregoing description, but this invention may be applied to the case where the magnetic head is a thin film head.

Further, although the flying head slider of this invention is discussed for use in a magneto-optical disk drive, the flying head slider can be used in a fixed magnetic disk drive alike.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A flying head slider being so tapered on one edge side area of one surface confronting a disk as to become thinner toward the edge, which flies due to the dynamic pressure by the air flowing from said edge side into the clearance between said disk and the tapered area according to the rotation of said disk and lifts off a head from said disk, comprising:
    plural inclined planes provided at both ends of said edge side in a direction orthogonal to the air flowing direction and tapered along said air flowing direction,
    said inclined planes at each end including first inclined planes provided on the farthest position from said edge and tapered at an angle for obtaining enough dynamic pressure for flying at a required height, and second inclined planes tapered at an angle greater than that of said first inclined planes; and
    a tapered region having a single incline plane extending orthogonal to the air flowing direction and between the plural inclined planes, said single incline planes having an angle of taper which is different from the angle of taper of the first and second inclined planes.

2. A flying head slider as set forth in claim 1, wherein said first and second inclined planes are respectively tapered at an angle within the range of 6 mrad to 30 mrad, and wherein the taper angle of the second inclined planes is greater than the taper angle of the single inclined plane which in turn is greater than the taper angle of the first inclined planes.

3. A flying head slider being so tapered on one edge side area of one surface confronting a disk as to become thinner toward the edge, which flies due to the dynamic pressure by the air flowing from said edge side into the clearance between said disk and the tapered area according to the rotation of said disk and lifts off a head from said disk, comprising:
    plural inclined planes provided at both ends of said edge side in a direction orthogonal to the air flowing direction and tapered along said air flowing direction, said inclined planes at each end including:
        first inclined planes provided on the farthest position from said edge and tapered at an angle to obtain enough dynamic pressure for flying at a required height, and
        second inclined planes tapered at an angle greater than that of said first inclined planes; and
    third inclined planes provided between said both ends on said one edge side and tapered at an angle greater than that of said first inclined planes.

4. A flying head slider as set forth in claim 3, wherein said third inclined planes are tapered at an angle within the range of 6 mrad to 30 mrad.

5. A flying head slider being so tapered on one edge side area of one surface confronting a disk as to become thinner toward the edge, which flies due to the dynamic pressure by the air flowing from said edge side into the clearance between said disk and the tapered area according to the rotation of said disk and lifts off a head from said disk, comprising:
    plural inclined planes provided at both ends of said edge side in a direction orthogonal to the air flowing direction and tapered along said air flowing direction, said inclined planes at each end including:
        first inclined planes provided on the farthest position from said edge and tapered at an angle to obtain enough dynamic pressure for flying at a required height, and
        second inclined planes tapered at an angle greater than that of said first inclined planes;
    wherein areas in the lower portion of the slider except said tapered area are rounded out in arcs.

6. A flying head slider being so tapered on one edge side area of one surface confronting a disk as to become thinner toward the edge, which flies due to the dynamic pressure by the air flowing from said edge side into the clearance between said disk and the tapered area according to the rotation of said disk and lifts off a head from said disk, comprising;

plural inclined planes provided at both ends of said edge side in a direction orthogonal to the air flowing direction and tapered along said air flowing direction, said inclined planes at each end include first inclined planes provided on the farthest position from said edge and tapered at an angle of obtaining enough dynamic pressure for flying at a required height, and second inclined planes provided nearer to said edge than said first inclined planes, and planes for isolating said first and second inclined planes.

7. A flying head slider as set forth in claim 6, wherein said first inclined plane is tapered at an angle within the range of 6 mrad to 30 mrad.

8. A flying head slider being so tapered on one edge side area of one surface confronting a disk as to become thinner toward the edge, which flies due to the dynamic pressure by the air flowing from said edge side into the clearance between said disk and the tapered area according to the rotation of said disk and lifts off a head from said disk, comprising;

first inclined planes each provided at each end of said edge side in a direction orthogonal to the air flowing direction and tapered along said air flowing direction at an angle of obtaining enough dynamic pressure for flying at a required height, and second inclined planes formed between said first inclined planes, having substantially the same length in said orthogonal direction as that of the first inclined planes.

9. A flying head slider as set forth in claim 8, wherein said first and second inclined planes are respectively tapered at an angle within the range of 6 mrad to 30 mrad.

10. A flying head slider being so tapered on one edge side area of one surface confronting a disk as to become thinner toward the edge, which flies due to the dynamic pressure by the air flowing from said edge side into the clearance between said disk and the tapered area according to the rotation of said disk and lifts off a head from said disk, comprising;

first inclined planes each provided at each end of said edge side in a direction orthogonal to the air flowing direction and tapered along said air flowing direction at an angle of obtaining enough dynamic pressure for flying at a required height, and second inclined planes provided between said first inclined planes and tapered at an angle smaller than that of the first inclined planes.

11. A flying head slider as set forth in claim 10, wherein said first and second inclined planes are respectively tapered at an angle within the range of 6 mrad to 30 mrad.

12. A flying head slider being so tapered on one edge side area of one surface confronting a disk as to become thinner toward the edge, which flies due to the dynamic pressure by the air flowing from said edge side into the clearance between said disk and the tapered area according to the rotation of said disk and lifts off a head from said disk, comprising;

first and second planes provided at each end of said edge side in a direction orthogonal to the air flowing direction and tapered along said air flowing direction, wherein said first inclined planes are provided on the farthest position from said edge and tapered at an angle of obtaining enough dynamic pressure for flying at a required height, and said second inclined planes are tapered at an angle greater than that of said first inclined planes, and third inclined planes provided between said both ends tapered at an angle smaller than that of said first inclined planes.

13. A flying head slider as set forth in claim 12, wherein said first, second and third inclined planes are respectively tapered at an angle within the range of 6 mrad to 30 mrad.

14. A flying head slider being so tapered on one edge side area of one surface confronting a disk as to become thinner toward the edge, which flies due to the dynamic pressure by the air flowing from said edge side into the clearance between said disk and the tapered area according to the rotation of said disk and lifts off a head from said disk, comprising;

first and second planes provided at each end of said edge side in a direction orthogonal to the air flowing direction and tapered along said air flowing direction, wherein said first inclined planes are provided on the farthest position from said edge and tapered at an angle of obtaining enough dynamic pressure for flying at a required height, and said second inclined planes are tapered at an angle greater than that of said first inclined planes, and third inclined planes provided between said both ends tapered at an angle substantially the same as that of said first inclined planes.

15. A flying head slider as set forth in claim 14, wherein said first, second and third inclined planes are respectively tapered at an angle within the range of 6 mrad to 30 mrad.

16. A flying head slider for use with a magnetic disk which is rotating in a rotating direction, said slider comprising:

a plate comprising:
a front air inflow surface which faces the rotating direction of the rotating disk,
a rear air outflow surface,
a lower surface facing the magnetic disk, the lower surface and the front air inflow surface defining a front edge region, and
opposed lateral walls connecting said inflow and outflow surfaces;

two outer tapered regions extending inwardly and orthogonally from the opposed lateral surfaces at the front edge region of the plate, said tapered regions having at least one inclined plane; and two inner tapered regions, each adjacent to an outer tapered region, each of said inner tapered regions having at least one inclined plane and extending orthogonally relative to the opposed lateral surfaces inwardly from the adjacent outer tapered region, at least one of the inclined planes of the outer tapered regions having an angle which is different from the angle of at least one of the inclined planes of the inner tapered regions.

17. The slider of claim 16 wherein the outer tapered regions each have two inclined planes, and the inner tapered regions each have one inclined plane.

18. The slider of claim 16 wherein the outer tapered regions each have one inclined plane, and the inner tapered regions each have one inclined plane.

* * * * *